United States Patent
Hui et al.

(10) Patent No.: US 9,106,338 B2
(45) Date of Patent: Aug. 11, 2015

(54) DUAL-WAVELENGTH BIDIRECTIONAL OPTICAL COMMUNICATION SYSTEM AND METHOD FOR COMMUNICATING OPTICAL SIGNALS

(71) Applicant: Avago Technologies General IP (Singapore) Pte. Ltd., Singapore (SG)

(72) Inventors: David Chak Wang Hui, Santa Clara, CA (US); Xiaozhong Wang, Cupertino, CA (US); Bing Shao, Sunnyvale, CA (US); Kit Cham, Cupertino, CA (US); Seng-Kum Chan, San Jose, CA (US); Ye Chen, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 55 days.

(21) Appl. No.: 13/764,547

(22) Filed: Feb. 11, 2013

(65) Prior Publication Data
US 2014/0226991 A1    Aug. 14, 2014

(51) Int. Cl.
| | |
|---|---|
| *H04B 10/12* | (2006.01) |
| *H04B 10/25* | (2013.01) |
| *H04B 10/40* | (2013.01) |
| *G02B 6/42* | (2006.01) |

(52) U.S. Cl.
CPC ............ *H04B 10/2503* (2013.01); *H04B 10/40* (2013.01); *G02B 6/4246* (2013.01); *G02B 6/4286* (2013.01)

(58) Field of Classification Search
CPC ........................... G02B 6/4246; G02B 6/4286
USPC ............... 398/67, 82, 83, 85, 86, 87, 88, 138, 398/139, 141, 143, 200, 201, 202, 212, 214, 398/41; 385/15, 47; 359/627, 629, 633
See application file for complete search history.

(56) References Cited

U.S. PATENT DOCUMENTS

| | | | | | |
|---|---|---|---|---|---|
| 5,963,349 | A | * | 10/1999 | Norte | 398/42 |
| 6,040,934 | A | * | 3/2000 | Ogusu et al. | 398/139 |
| 6,272,274 | B1 | | 8/2001 | Greene | |
| 7,088,518 | B2 | * | 8/2006 | Tatum et al. | 359/634 |
| 7,171,081 | B1 | | 1/2007 | Ko et al. | |
| 7,272,323 | B2 | * | 9/2007 | Grann et al. | 398/139 |
| 7,281,865 | B2 | * | 10/2007 | Baek et al. | 385/92 |
| 7,413,355 | B2 | * | 8/2008 | Nishizawa et al. | 385/93 |
| 8,090,266 | B2 | * | 1/2012 | Glebov et al. | 398/139 |
| 8,126,329 | B2 | * | 2/2012 | Murry et al. | 398/83 |
| 2004/0161240 | A1 | * | 8/2004 | Weber | 398/139 |
| 2004/0175181 | A1 | * | 9/2004 | Grann et al. | 398/139 |

(Continued)

FOREIGN PATENT DOCUMENTS

KR    10-2004-0063039 A    7/2004

*Primary Examiner* — Vanderpuye Kenneth
*Assistant Examiner* — Amritbir Sandhu (57) ABSTRACT

A bidirectional optical communication system includes first and second transceivers arranged at opposed ends of an optical medium. Opto-electronic devices within the transceivers are arranged on respective mounting surfaces of planar substrates. First and second optical assemblies couple the respective transceivers to the optical medium. The optical assemblies include first and second optical elements arranged along an axis normal to the substrates. The first optical element is transparent to the optical signal transmitted from the respective transceiver and redirects the received optical signal from the other transceiver. The optical assemblies enable a single alignment of the opto-electronic devices and the optical medium.

22 Claims, 4 Drawing Sheets

(56) References Cited

U.S. PATENT DOCUMENTS

| | | | |
|---|---|---|---|
| 2006/0083514 A1* | 4/2006 | Liu et al. | 398/85 |
| 2007/0104426 A1* | 5/2007 | Yun et al. | 385/88 |
| 2008/0285914 A1* | 11/2008 | Matsuoka et al. | 385/24 |
| 2009/0196617 A1* | 8/2009 | Yoshizaki et al. | 398/82 |
| 2009/0202244 A1* | 8/2009 | Jin et al. | 398/67 |
| 2010/0054751 A1* | 3/2010 | Murry et al. | 398/137 |
| 2010/0086310 A1* | 4/2010 | Lee et al. | 398/138 |
| 2010/0209103 A1* | 8/2010 | Sakigawa et al. | 398/45 |
| 2010/0329669 A1* | 12/2010 | Cunningham et al. | 398/41 |
| 2011/0044696 A1* | 2/2011 | Lim et al. | 398/139 |
| 2012/0002284 A1* | 1/2012 | McColloch et al. | 359/558 |
| 2014/0029953 A1* | 1/2014 | Otte et al. | 398/139 |
| 2014/0099055 A1* | 4/2014 | Chen et al. | 385/33 |
| 2014/0226990 A1* | 8/2014 | Hui et al. | 398/141 |
| 2014/0226991 A1* | 8/2014 | Hui et al. | 398/141 |

\* cited by examiner

DUAL-WAVELENGTH BIDIRECTIONAL OPTICAL COMMUNICATION SYSTEM AND METHOD FOR COMMUNICATING OPTICAL SIGNALS

BACKGROUND

A conventional optical communication link includes at least one optical transmitter at a first end of the link, such as a laser, one optical receiver at a second end of the link, such as a photodiode, and at least one optical fiber interconnecting the transmitter and receiver. Such optical communication links are in wide use in today's data centers and supercomputers.

An economical multi-mode fiber link is often preferred for optical links in the range of about 1 to 300 meters. Today's electronics can effectively support desired data rates up to about 14 Gbps using vertical cavity surface emitting lasers (VCSELs).

The demand for additional increases in data throughput in existing data centers presently involves adding fiber or upgrading equipment such as servers and switches. With relatively faster servers and switches capable of operating with faster clock and data signals than those used in presently installed servers and switches. Installing additional fiber and replacing existing equipment is not only costly it is disruptive to the operation of the data center. As an alternative to adding fiber and upgrading servers and switches to increase data throughput, data center operators can use the existing fiber infrastructure and increase the data rate. However, with increasing data rates it becomes more difficult to maintain signal integrity. In addition, when the optical signal is modulated at a higher data rate, the distance over which such a link can successfully achieve the higher data is expected to decrease. Consequently, data center operators might have to reroute fiber links or move equipment. Again, such solutions are both costly and disruptive to data center operation.

SUMMARY

An optical communication system and method for bidirectionally communicating optical signals use complimentary sub-assemblies on each end of an optical medium. The sub-assemblies include a transceiver and an optical assembly. The transceivers are configured by arranging opto-electronic devices on a mounting surface of a planar substrate. The optical assemblies include, among other optical elements, an optical element that is substantially transparent to incident light having a first range of wavelengths and that redirects incident light having a second range of frequencies different from the first range of frequencies. Both optical assemblies include an optical element that redirects both a transmitted optical signal and a received optical signal.

In an exemplary embodiment, a bidirectional communication system includes first and second transceivers, first and second optical assemblies and an optical medium. The first transceiver includes a first opto-electronic light source and a first opto-electronic light detector arranged on a planar substrate. The first opto-electronic light source is configured to emit a first optical signal at a first wavelength. The first opto-electronic light detector is responsive to a second optical signal at a second wavelength different from the first wavelength. The first optical assembly includes a first optical element configured to couple the first optical signal into a first end of the optical medium and redirect the second optical signal to a second optical element. The second optical element is transparent to the first optical signal at the first wavelength and redirects the second optical signal to the first opto-electronic light detector. The second transceiver includes a second opto-electronic light source and a second opto-electronic light detector arranged on a planar substrate. The second opto-electronic light source is configured to emit a second optical signal at a second wavelength. The second opto-electronic light detector is responsive to the first optical signal at the first wavelength. The second optical assembly includes a third optical element configured to couple the second optical signal into the second end of the optical medium and redirect the first optical signal to a fourth optical element. The fourth optical element is transparent to the second optical signal at the second wavelength and redirects the first optical signal to the second opto-electronic light detector.

In another exemplary embodiment, a method for communicating using optical signals includes the steps of providing an optical medium having a first end and a second end, providing a first transceiver having a first opto-electronic light source configured to emit a first optical signal at a first wavelength, a first opto-electronic light detector responsive to a second optical signal at a second wavelength different from the first wavelength, the first opto-electronic light source and the first opto-electronic light detector arranged on a first planar substrate, generating the first optical signal along a first axis from an emitter of the first opto-electronic light source, providing a second transceiver having a second opto-electronic light source and a second opto-electronic light detector, the second opto-electronic light source configured to emit the second optical signal, the second opto-electronic light detector responsive to the first optical signal, the second opto-electronic light source and the second opto-electronic light detector arranged on a second planar substrate, generating the second optical signal along a second axis from an emitter of the second opto-electronic light source, using a first optical assembly to optically couple the first transceiver at the first end of the optical medium, wherein the first optical assembly includes a first optical element transparent to the first optical signal and that redirects the second optical signal and a second optical element that redirects both the first optical signal and the second optical signal, the first optical signal propagating toward the optical medium, the second optical signal propagating toward the first optical element, and using a second optical assembly to optically couple the second transceiver at the second end of the optical medium, wherein the second optical assembly uses a third optical element transparent to the second optical signal and that redirects the first optical signal and a fourth optical element that redirects both the first optical signal and the second optical signal, the first optical signal propagating toward the third optical element, the second optical signal propagating toward the optical medium.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The bidirectional optical communication system and methods for communicating optical signals can be better understood with reference to the following drawings. The components in the drawings are not necessarily to scale, emphasis instead being placed upon clearly illustrating the principles of the present invention.

DETAILED DESCRIPTION

The described issues with increasing data throughput while reusing an installed fiber infrastructure are addressed by a bidirectional communication system in which the opto-electronic devices in the respective transceivers are arranged in a desired configuration on a mounting surface of a planar substrate and by a respective optical assembly that couples the complimentary transceiver to an end of the optical fiber. The optical assemblies include first and second optical elements arranged along an axis normal to the substrates. The first optical element is transparent to the optical signal transmitted from the respective transceiver and redirects the received optical signal from the other transceiver. The optical assemblies enable a single alignment of the opto-electronic devices of the transceiver and of the optical medium.

As briefly described above, a single optical medium, such as a multimode fiber presently in use in a data center, is modified by disconnecting the optical medium from the data center devices and reconnecting the optical medium to complimentary assemblies. The assemblies are configured with corresponding connectors to connect the data center devices and the optical medium. The sub-assemblies include paired transceivers and optical sub-assemblies that are capable of generating and coupling respective optical signals into the respective ends of the optical medium. The described modification provides an inexpensive solution for increasing data throughput while reusing presently installed fiber runs in a data center.

Figure 1:
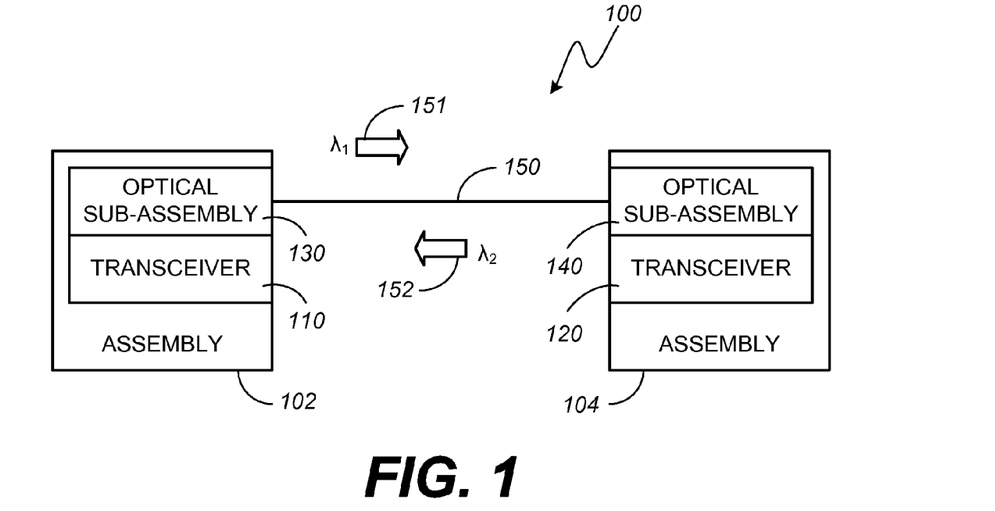
FIG. 1 is a schematic view of a bidirectional communication system, in accordance with an exemplary embodiment of the invention.

As illustrated schematically in FIG. 1, assembly 102 and assembly 104 are connected at opposed ends of optical medium 150 to form a bidirectional communication system 100. Assembly 102 includes transceiver 110 and optical sub-assembly 130. A first optical signal 151 is generated by the transceiver 110 and coupled from optical sub-assembly 130 into the optical medium 150, which conveys the first optical signal 151 to assembly 104 at the opposed end of the optical medium 150. The first optical signal 151 has a wavelength, $\lambda_1$ that is about 855 nm and is within a range from about 840 nanometers (nm) to 870 nm.

Assembly 104 includes transceiver 120 and optical sub-assembly 140. Similarly, a second optical signal 152 is generated and coupled from assembly 104 into the optical medium 150, which conveys the second optical signal 152 to assembly 102 at the first end of the optical medium 150. The second optical signal 152 has a wavelength, $\lambda_2$ that is about 905 nm and is within a range from about 890 nm to 920 nm.

As described in further detail below, optical sub-assembly 130 includes an optical element that redirects both the first optical signal 151 and the second optical signal 152 from the longitudinal axis of the optical medium 150 and a second optical element that is transparent to the first optical signal 151 and that redirects the second optical signal 152.

Similarly, optical sub-assembly 140 includes an optical element that redirects both the first optical signal 151 and the second optical signal 152 from the longitudinal axis of the optical medium 150 and a second optical element that is transparent to the second optical signal 152 and that redirects the first optical signal 151.

Figure 2:
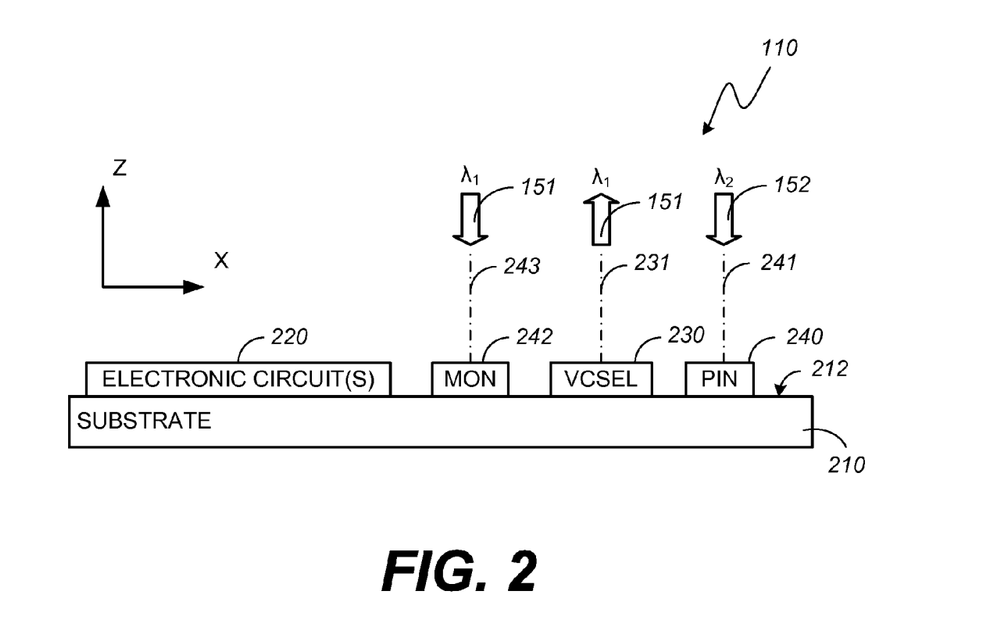
FIG. 2 is a side elevation view of one of the transceivers of FIG. 1.

FIG. 2 is a side elevation view of an exemplary embodiment of transceiver 110 introduced in FIG. 1. The transceiver 110 is an electro-optical device that can bidirectionally communicate, i.e., transmit and receive, optical signals. In the illustrated embodiment, the various electronic and electro-optical devices of the transceiver 110 are arranged on a mounting surface 212 of a substantially planar substrate 210. As illustrated, the mounting surface 212 is substantially parallel with the X-Y plane. The locations of these components can be arranged to optimize for best optical and electrical performance.

The substrate 210 is made from a layer of semiconductor material or in alternative arrangements can be a printed circuit board. The opto-electronic devices can include a laser or other light source 230, such as a vertical cavity surface-emitting laser (VCSEL). Light source 230 produces or emits the first optical signal 151 in response to electrical signals with which it is driven. The first optical signal 151 is emitted from light source 230 along optical axis 231 in the positive Z-direction and is coupled and optically manipulated by optical sub-assembly 130 in the manner described in further detail below.

The opto-electronic devices further include a photodiode or other primary light detector 240, such as a positive-intrinsic-negative (PIN) diode. Primary light detector 240 produces electrical signals in response to the second optical signal 152 that is received by transceiver 110 and that impinges upon primary light detector 240 along optical axis 241 in the negative Z-direction in the manner described in further detail below.

The opto-electronic devices can also include a similar photodiode or other light detector such as monitor or MON 242. MON 242 produces electrical signals in response to a portion of the transmitted first optical signal 151 that impinge upon an active surface of the MON 242 along optical axis 243 in the negative Z-direction.

Electronic circuits 220, such as driver and receiver integrated circuits, process the electrical signals. The various opto-electronic devices and electronic circuit(s) 220 can be interconnected by wirebonds, signal traces, or using any number of conventional mechanisms (not shown). Electrical signals that represent the information carried in the transmitted and received optical signals can be communicated with other (external) systems by electrical contacts (not shown) on substrate 210.

Figure 3:
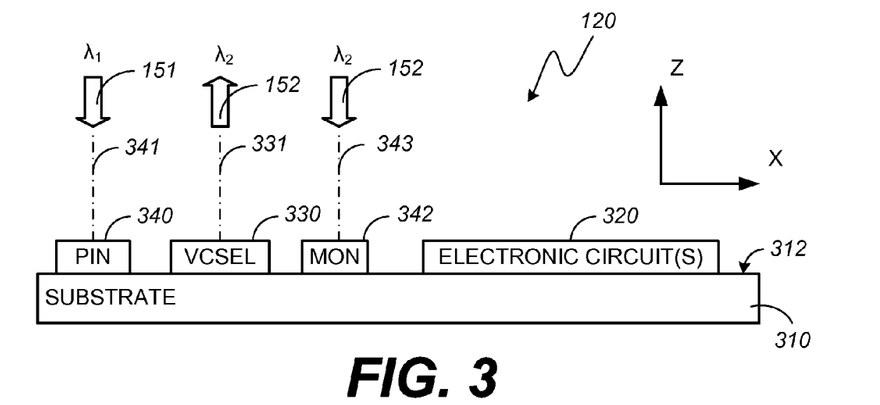
FIG. 3 is a side elevation view of the other transceiver of FIG. 1.

FIG. 3 is a side elevation view of an exemplary embodiment of transceiver 120 introduced in FIG. 1. Transceiver 120 is an electro-optical device that can bidirectionally communicate, i.e., transmit and receive, optical signals. In the illustrated embodiment, the various electronic and electro-optical devices of the transceiver 120 are arranged on a mounting surface 312 of a substantially planar substrate 310. Similar to the mounting surface 212 of transceiver 110, the mounting surface 312 is substantially parallel with the X-Y plane.

However, it should be understood that the convention of describing both the mounting surface 212 of transceiver 110 and the mounting surface 312 of transceiver 120, as being parallel to the X-Y plane, is for convenience of description and is limited to the arrangements of devices within the separate assemblies. Stated another way, the opto-electronic devices (e.g., the light source 230, the primary light detector 240, the monitor detector 242) arranged on the mounting surface 212 are coplanar but not necessarily on the same plane as complimentary opto-electronic devices (e.g., the light source 330, the primary light detector 340, the monitor detector 342) arranged on the mounting surface 312 of the transceiver 120.

The substrate 310 is made from a layer of semiconductor material or in alternative arrangements can be a printed circuit board. The opto-electronic devices can include a laser or other light source 330, such as a VCSEL. Light source 330 produces or emits the second optical signal 152 in response to electrical signals with which it is driven. The second optical signal 152 is emitted from light source 330 along optical axis 331 in the positive Z-direction and is coupled and optically manipulated by optical sub-assembly 140 in the manner described in further detail below.

The opto-electronic devices further include a photodiode or primary light detector 340, such as PIN diode. Primary light detector 340 produces electrical signals in response to the first optical signal 151 that is received by transceiver 120 and that impinges upon primary light detector 340 along optical axis 341 in the negative Z-direction in the manner described in further detail below.

The opto-electronic devices can also include a similar photodiode or other light detector or monitor (labeled MON) 342. MON 342 produces electrical signals in response to a portion of the transmitted second optical signal 152 that impinges upon an active surface of the MON 342 along optical axis 343 in the negative z-direction in the manner described in further detail below.

Electronic circuits 320, such as driver and receiver integrated circuits, process the electrical signals. The various opto-electronic devices and electronic circuit(s) 320 can be interconnected by wirebonds, signal traces, or using any number of conventional mechanisms (not shown). Electrical signals that represent the information carried in the transmitted and received optical signals can be communicated with other (external) systems by electrical contacts (not shown) on substrate 310.

Figure 4:
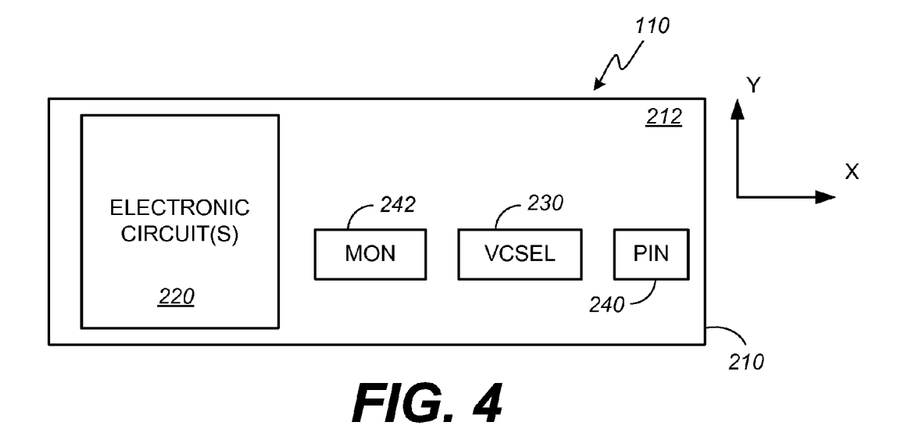
FIG. 4 is a schematic top plan view of the transceiver of FIG. 2.

FIG. 4 includes an exemplary embodiment of the transceiver 110 of FIG. 2. More specifically, FIG. 4 includes a schematic top plan view of the transceiver 110. That is, the illustration shows the transceiver 110 from the perspective of an observer in the negative Z-direction looking at the mounting surface 212. The electronic circuit(s) 220 can be an integrated circuit, a collection of integrated circuits and electrically coupled elements, or a collection of electrically coupled elements. The electronic circuit(s) 220 are shown along the left-most side of the mounting surface 212. However, these driver and receiver integrated circuits and or discrete electronic devices that assist in generating or otherwise processing the electrical signals that represent the information communicated with external systems can be distributed across the mounting surface 212.

Figure 6:
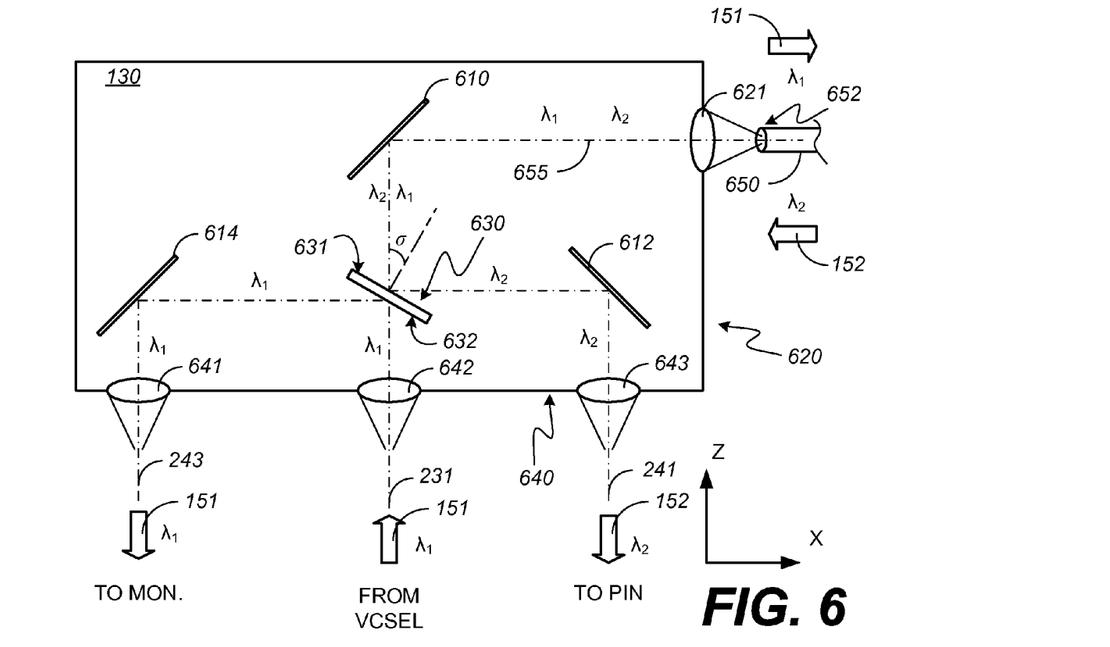
FIG. 6 is a schematic side elevation view of one of the optical assemblies of FIG. 1.

The light source or VCSEL 230, the primary light detector or PIN 240, and the monitor detector or MON 242 are located on the mounting surface 212 so that the optical axis 231 extending from the emitter of the VCSEL 230, the optical axis 241 extending from the photo-sensitive surface of the PIN 240, and the optical axis 243 extending from the photo-sensitive surface of the MON 242, can be arranged in registration with one or more corresponding optical elements of the optical sub-assembly 130 (FIG. 1) in the manner described in association with FIG. 6 to optically couple the transceiver 110 to the optical sub-assembly 130.

Figure 5:
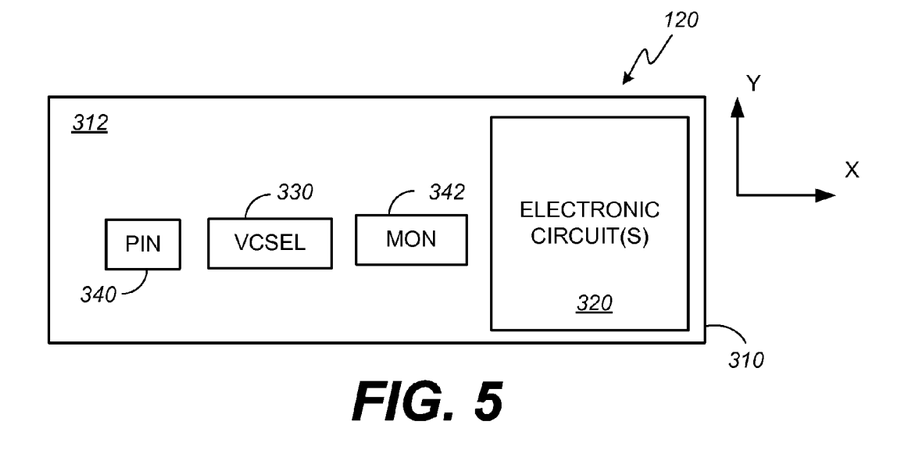
FIG. 5 is a schematic top plan view of the transceiver of FIG. 3.

FIG. 5 includes an exemplary embodiment of the transceiver 120 of FIG. 3. More specifically, FIG. 5 includes a schematic top plan view of the transceiver 120. That is, the illustration shows the transceiver 120 from the perspective of an observer in the negative Z-direction looking at the mounting surface 312. The electronic circuit(s) 320 can be an integrated circuit, a collection of integrated circuits and electrically coupled elements, or a collection of electrically coupled elements. The electronic circuit(s) 320 are shown along the right-most side of the mounting surface 312. However, these driver and receiver integrated circuits and or discrete electronic devices that assist in generating or otherwise processing the electrical signals that represent the information communicated with external systems can be distributed across the mounting surface 312.

Figure 7:
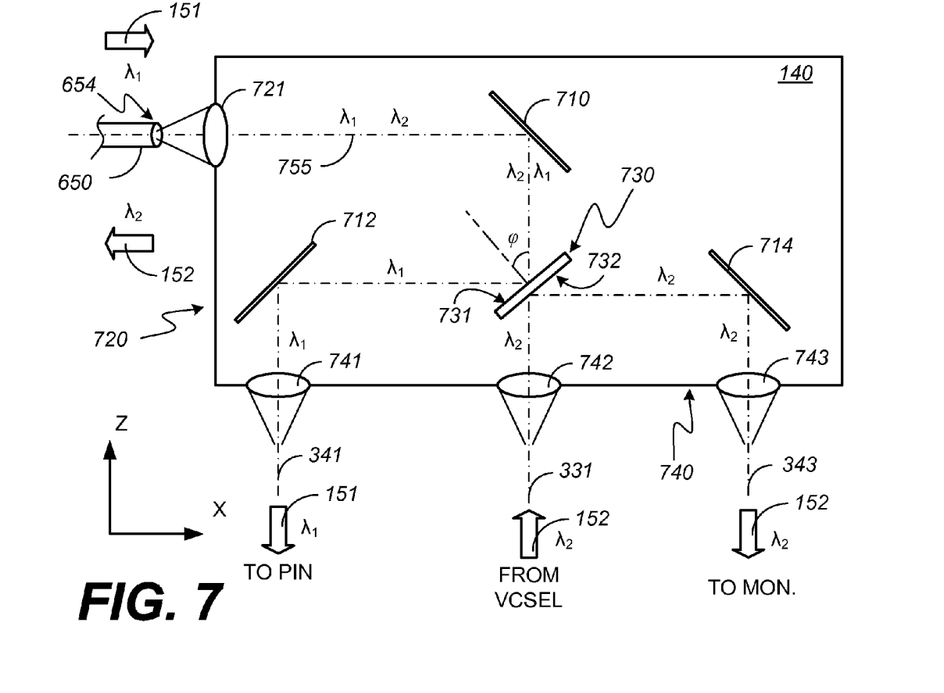
FIG. 7 is a schematic side elevation view of the other optical assembly of FIG. 1.

The light source or VCSEL 330, the primary light detector or PIN 340, and the monitor detector or MON 342 are located on the mounting surface 312 so that the optical axis 331 extending from the emitter of the VCSEL 330, the optical axis 341 extending from the photo-sensitive surface of the PIN 340, and the optical axis 343 extending from the photo-sensitive surface of the MON 342, can be arranged in registration with one or more corresponding optical elements of the optical sub-assembly B 140 (FIG. 1) in the manner described in association with FIG. 7 to optically couple the transceiver 120 to the optical sub-assembly 140.

FIG. 6 is a schematic side elevation view of one of the optical assemblies of FIG. 1. FIG. 6 includes an exemplary embodiment of the optical sub-assembly 130 of FIG. 1. More specifically, FIG. 6 includes a schematic side elevation view of the optical sub-assembly 130. That is, the illustration shows the optical sub-assembly 130 from the perspective of an observer looking in the Y-direction at a side surface of the optical sub-assembly 130.

The optical sub-assembly 130 includes a body manufactured from a material that is transparent to the transmitted and received optical signals. An example of such a material is available under the brand name ULTEM® (e.g., ULTEM 1010), which is an amorphous thermoplastic material produced by SABIC Innovative Plastics of Saudi Arabia (formerly General Electric Plastics Division).

As the body of the optical sub-assembly 130 is made of an optically transparent material and as shown in the illustrated embodiment, a lens 641, lens 642, lens 643 and lens 621 can be defined by portions that are unitarily molded with the surrounding portions of the body of the optical sub-assembly 130. One or both of optical sub-assembly 130 and transceiver 110 may be configured with various features for aligning surface 640 of the optical sub-assembly 130 with the opto-electronic elements on the mounting surface 212 of transceiver 110. Lens 641 is arranged along surface 640 in a location in the X-Y plane that results in registration with the optical axis 243 when the optical sub-assembly is placed in close arrangement with transceiver 110. Lens 642 is arranged along surface 640 at a second location in the X-Y plane that results in registration with optical axis 231. Similarly, lens 621 is arranged along surface 620 at a location in the Y-Z plane that results in registration with the longitudinal axis 655 of a light medium.

In the illustrated embodiment, the light medium is a multimode optical fiber 650. A first end 652 of the multimode optical fiber 650 is shown in registration with lens 621. Various structures at the interface between the multi-mode optical fiber 650 and lens 621 are not shown in the illustrated embodiment for simplicity of illustration and description. Those skilled in the art will understand how to suitably arrange the multi-mode optical fiber 650 at the proper distance from lens 621 and such that the longitudinal axis of the multi-mode optical fiber 650 is aligned with optical axis 655 within the optical sub-assembly 130.

As illustrated in FIG. 6, the optical sub-assembly 130 is arranged with optical element 630 and optical element 610 intersecting optical axis 231. Lens 642 collimates the first optical signal 151 emitted by light source 230 along optical axis 231 where it encounters optical element 630 and optical element 610. Optical element 630 has a first surface 631 and a second surface 632. Optical element 630 is substantially transparent to impinging light at the first wavelength ($\lambda_1$). That is, a first or majority portion of the first optical signal 151 passes through optical element 630 absent redirection. As indicated in broken line in FIG. 6, this first portion of the first optical signal 151 passes through optical element 630 along optical axis 231 and is redirected at a non-zero angle with respect to optical axis 231 by optical element 610 in a direction toward lens 621, which focuses the first portion of the first optical signal 151 on the first end 652 of the multi-mode optical fiber 650. In this manner, the first optical signal 151 is coupled, manipulated and launched along the multi-mode optical fiber 650 by the optical sub-assembly 130.

As similarly indicated in broken line in FIG. 6, the second portion of the first optical signal 151, as indicated in the illustration by the label $\lambda_1$, is redirected by surface 632 of optical element 630 toward optical element 614 at a (non-zero) angle with respect to optical axis 231. This second portion of the first optical signal 151 is redirected by optical element 614 in a direction along optical axis 243 toward lens 641, which focuses the second portion of the first optical signal 151 on an active surface of MON 242. In this manner, a portion of first optical signal 151 is twice redirected and optically coupled to the light monitor detector or MON 242 of transceiver 110.

As also indicated by broken line in FIG. 6, the second optical signal 152, as indicated in the illustration by the label $\lambda_2$, and as conveyed along the multi-mode optical fiber 650 from transceiver 120, is collimated by lens 621 and passed along optical axis 655 to optical element 610, which redirects the second optical signal 152 toward surface 631 of optical element 630. The once redirected second optical signal 152 impinges surface 631 of optical element 630 at an angle of incidence 6 that is in a range of about 20 to 45 degrees and is further redirected at a non-zero angle with respect to optical axis 231 toward optical element 612. Thereafter, the second optical signal 152 is further redirected at a non-zero angle by optical element 612 such that the redirected signal is forwarded in a direction along optical axis 241 toward lens 643, which focuses the second optical signal 152 on an active surface of PIN 240. In this manner, the second optical signal 152 is thrice redirected and optically coupled to the PIN 240 of transceiver 110.

FIG. 7 includes an exemplary embodiment of the optical sub-assembly 140 of FIG. 1. That is, the illustration shows the optical sub-assembly 140 from the perspective of an observer looking in the Y-direction at a side surface of the optical sub-assembly 140.

The optical sub-assembly 140 includes a body manufactured from a material that is transparent to the transmitted and received optical signals. The material can be the same material used to manufacture the body of optical sub-assembly 130.

As the body of the optical sub-assembly 140 is made of an optically transparent material and as shown in the illustrated embodiment, a lens 741, lens 742, lens 743 and lens 721 can be defined by portions that are unitarily molded with the surrounding portions of the body of the optical sub-assembly 140. One or both of optical sub-assembly 140 and transceiver 120 may be configured with various features for aligning surface 740 of the optical sub-assembly 140 with the optoelectronic elements on the mounting surface 312 of transceiver 120. Lens 741 is arranged along surface 740 in a location in the X-Y plane that results in registration with the optical axis 343 when the optical sub-assembly 140 is placed in close arrangement with transceiver 120. Lens 742 is arranged along surface 740 at a second location in the X-Y plane that results in registration with optical axis 331. Similarly, lens 721 is arranged along surface 720 at a location in the Y-Z plane that results in registration with the longitudinal axis of a light medium.

In the illustrated embodiment, the light medium is a multimode optical fiber 650. A second end 654 of the multi-mode optical fiber 650 is shown in registration with lens 721. Various structures at the interface between the multi-mode optical fiber 650 and lens 721 are not shown in the illustrated embodiment for simplicity of illustration and description. Those skilled in the art will understand how to suitably arrange the multi-mode optical fiber 650 at the proper distance from lens 721 and such that the longitudinal axis of the multi-mode optical fiber 650 is aligned with optical axis 755 within the optical sub-assembly 140.

As illustrated in FIG. 7, the optical sub-assembly 140 is arranged with optical element 730 and optical element 710 intersecting optical axis 331. Lens 742 collimates the second optical signal 152 emitted by light source 330 along optical axis 331 where it encounters optical element 730 and optical element 710. Optical element 730 has a first surface 731 and a second surface 732. Optical element 730 is substantially transparent to impinging light at the second wavelength ($\lambda_2$). That is, a first or majority portion of the second optical signal 152 passes through optical element 730 absent redirection. As indicated in broken line in FIG. 7, this first portion of the second optical signal 152 passes through optical element 730 along optical axis 331 and is redirected at a non-zero angle with respect to optical axis 331 by optical element 710 in a direction toward lens 721, which focuses the first portion of the second optical signal 152 on the second end 654 of the multi-mode optical fiber 650. In this manner, the second optical signal 152 is coupled, manipulated and launched along the multi-mode optical fiber 650 by the optical sub-assembly 140.

As similarly indicated in broken line in FIG. 7, the second portion of the second optical signal 152, as indicated in the illustration by the label $\lambda_2$, is redirected by surface 732 of optical element 730 toward optical element 714 at a (non-zero) angle with respect to optical axis 331. This second portion of the second optical signal 152 is redirected by optical element 714 in a direction along optical axis 343 toward lens 743, which focuses the second portion of the second optical signal 152 on an active surface of MON 342. In this manner, a portion of second optical signal 152 is twice redirected and optically coupled to the light monitor detector or MON 342 of transceiver 120.

As also indicated by broken line in FIG. 7, the first optical signal 151, as indicated in the illustration by the label $\lambda_1$, and as conveyed along the multi-mode optical fiber 650 from transceiver 110, is collimated by lens 721 and passed along optical axis 755 to optical element 710, which redirects the first optical signal 151 toward surface 731 of optical element 730. The once redirected first optical signal 151 impinges surface 731 of optical element 730 at an angle of incidence φ that is in a range of about 20 to 45 degrees and is further redirected at a non-zero angle with respect to optical axis 331 toward optical element 712. Thereafter, the first optical signal 151 is further redirected at a non-zero angle by optical element 712 such that the redirected signal is forwarded in a direction along optical axis 341 toward lens 741, which focuses the first optical signal 151 on an active surface of PIN 340. In this manner, the first optical signal 151 is thrice redirected and optically coupled to the PIN 340 of transceiver 120.

As described above, optical element 630 and optical element 730 are filters that allow a majority of the light of a select wavelength or range of wavelengths to pass through, while redirecting light of a second select wavelength or range of wavelengths. The minority portion of the light at the select wavelength is redirected for monitoring the quality of the transmitted optical signal at the select wavelength. The filters are arranged from multiple layers of dielectric and or metallic materials over a glass or plastic substrate.

Optical element 610 and optical element 710 redirect both the first optical signal 151 and the second optical signal 152. These elements can be implemented with materials such as plastic and glass that result in a total internal reflection over the desired wavelengths. This can be accomplished with or without films or layers of metallic materials or dielectric materials. Alternatively, a total internal reflection over the desired wavelengths can be avoided to provide attenuation. Still further alternatives include using filters to implement optical element 610 and optical element 710. Such filters could be arranged to prevent the redirection of incident light at wavelengths below about 840 nm and above about 920 nm.

Optical element 614 and optical element 712 redirect the first optical signal 151. These elements can similarly be arranged to generate a total internal reflection of the first optical signal 151. Alternatively, a total internal reflection over the desired wavelength of about 855 nm can be avoided to provide attenuation. Still further alternatives include using filters to implement optical element 614 and optical element 712. Such filters could be arranged to prevent the redirection of incident light at wavelengths above about 870 nm to prevent crosstalk from the second optical signal 152.

Optical element 612 and optical element 714 redirect the second optical signal 152. These elements can similarly be arranged to generate a total internal reflection of the second optical signal 152. Alternatively, a total internal reflection over the desired wavelength of about 905 nm can be avoided to provide attenuation. Still further alternatives include using filters to implement optical element 612 and optical element 714. Such filters could be arranged to prevent the redirection of incident light at wavelengths below about 890 nm to prevent crosstalk from the first optical signal 151.

The illustrated and described embodiments of the assembly 102 and assembly 104 can be implemented in a variety of fiber optic packages, including standard small form-factor pluggable plus (SFP+) and quad small form-factor pluggable (QSFP) packages.

While the illustrated and described embodiments are directed to a first optical signal operating at a wavelength of about 855 nm and a second optical signal operating at a wavelength of about 905 nm, the two wavelengths can be selected based on multiple factors. For example, the bandwidth of the installed fiber in a data center and the availability of low-cost VCSEL-based transceivers. Optical fibers in accordance with the OM3 or OM4 classifications identified in the ISO 11801 standard are designed to have a peak bandwidth around 850 nm. Deviation from this wavelength will reduce the bandwidth of the communication link, which in turn reduces the distance the optical signal can travel without significant impairment. By selecting a second wavelength close to 850 nm, it is expected that an acceptable link distance can be maintained for data center applications. Relatively low-cost VCSELs optimized for operation at a wavelength of about 905 nm are available. Thus, by selecting the wavelength of the second optical signal to be about 905 nm can achieve a good balance between transceiver cost and potential link distance.

Figure 8:
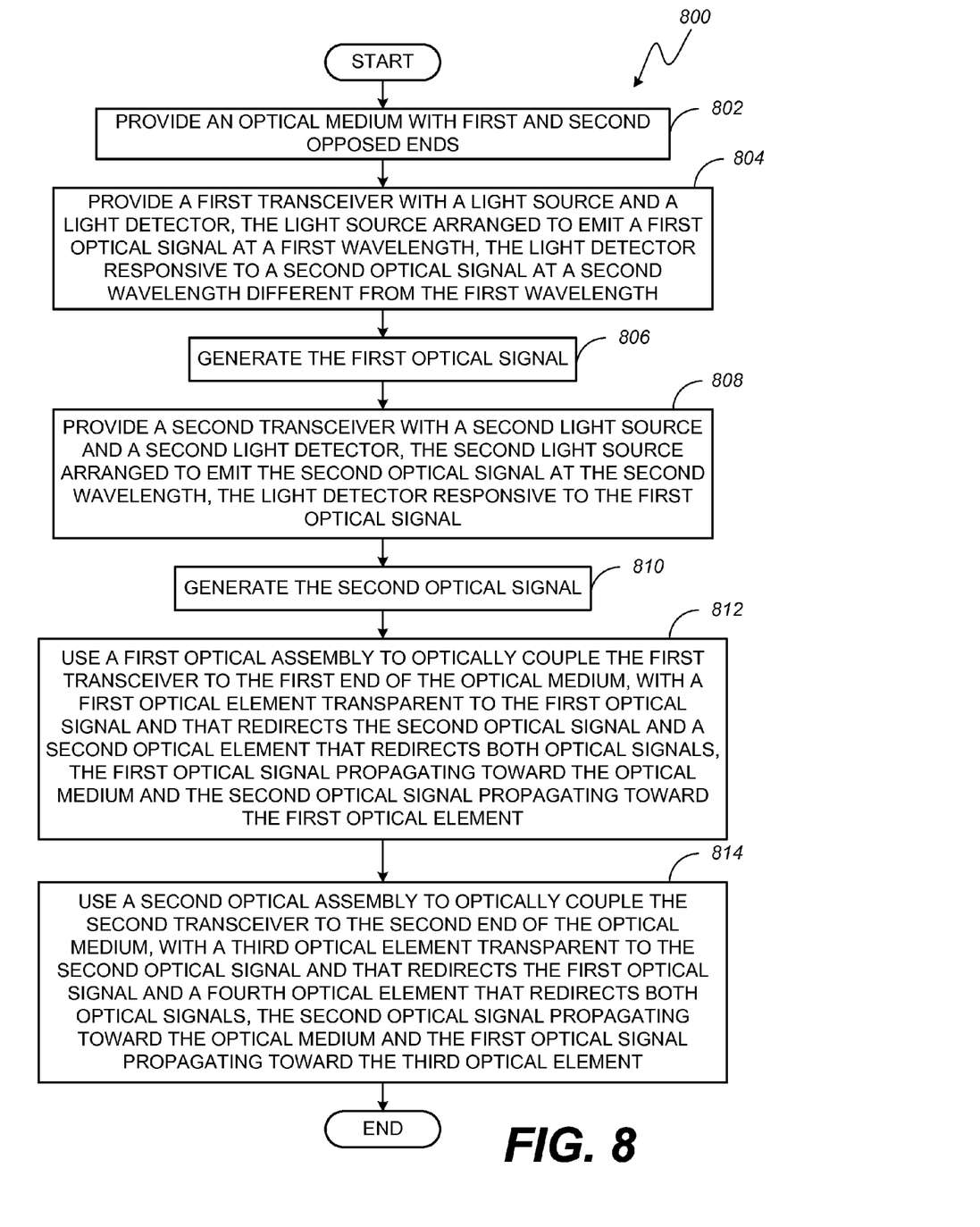
FIG. 8 is a flow diagram illustrating a method of communicating via optical signals aligned and coupled using the system of FIG. 1.

FIG. 8 is a flow diagram illustrating a method 800 of communicating via optical signals aligned and coupled using the system of FIG. 1. Method 800 begins with block 802 where an optical medium with first and second opposed ends is provided. As explained above, the optical medium can be a multimode optical fiber suitable for supporting communication over link lengths of up to about 300 m for signals operating at a data rate of 10 Gbit/s or more. For example, the optical medium can be a multimode fiber in accordance with the OM3 or OM4 classifications identified in the ISO 11801 standard.

In block 804, a first transceiver is provided. As indicated, the first transceiver includes a light source and a light detector. The light source is arranged to emit a first optical signal at a first wavelength (e.g., 855 nm+/−15 nm). The light detector is responsive to incident light received from a second optical signal at a second wavelength (e.g., 905 nm+/−15 nm). In block 806, the first transceiver is used to generate the first optical signal.

In block 808, a second transceiver is provided. As indicated, the second transceiver includes a light source and a light detector. The light source is arranged to emit the second optical signal. The light detector is responsive to incident light received from the first optical signal. In block 810, the second transceiver is used to generate the second optical signal.

In block 812, a first optical sub-assembly optically couples the first transceiver to the first end of the optical medium. As indicated, the first optical sub-assembly includes a first optical element and a second optical element. The first optical element is transparent to the first optical signal and redirects the second optical signal. The second optical element redirects both optical signals. The optical sub-assembly is arranged such that the first optical signal propagates toward the optical medium while the second optical signal propagates toward the first optical element.

In block 814, a second optical sub-assembly optically couples the second transceiver to the second or opposed end of the optical medium. As indicated, the second optical sub-assembly includes a third optical element and a fourth optical element. The third optical element is transparent to the second optical signal and redirects the first optical signal. The fourth optical element redirects both optical signals. The optical sub-assembly is arranged such that the second optical signal propagates toward the optical medium while the first optical signal propagates toward the third optical element.

It should be understood by those skilled in the art that the functions associated in the blocks 802-814 can be performed in alternative sequences than the sequence illustrated in FIG. 8. For example, the method is not limited to providing either transceiver or either optical sub-assembly prior to providing the complimentary transceiver or optical sub-assembly. By way of further example, either optical signal can be generated prior to or after the other optical signal. In addition, it will be further recognized that the presence of an optical signal is not required to physically couple the first optical sub-assembly to the optical medium or the first transceiver. Similarly, the presence of an optical signal is not required to physically couple the second optical sub-assembly to the optical medium or to the second transceiver. Consequently, it is possible to generate the first optical signal as shown in association with block 806 after the first optical sub-assembly is physically coupled to the optical medium and the first transceiver. Similarly, it is possible to generate the second optical signal as shown in association with block 810 after the second optical sub-assembly is physically coupled to the optical medium and the second transceiver.

One or more illustrative or exemplary embodiments of the invention have been described above. However, it is to be understood that the invention is defined by the appended claims and is not limited to the specific embodiments described.

What is claimed is:

1. A bidirectional communication system, comprising:
an optical medium having a first end and a second end;
a first opto-electronic assembly optically coupled via a first optical assembly to the first end of the optical medium, the first opto-electronic assembly including a first light source, a primary light detector, and a first monitor arranged on a surface of a first substrate such that the first light source emits a first optical signal at a first wavelength along a first optical axis normal to the surface of the first substrate and such that the first monitor receives a portion of the first optical signal along a second optical axis parallel to the first optical axis when the first optical signal and the portion of the first optical signal are proximal to the first light source and the first monitor, respectively; and
a second opto-electronic assembly coupled via a second optical assembly to the second end of the optical medium, the second opto-electronic assembly including a second light source, a secondary light detector, and a second monitor arranged on a surface of a second substrate such that the second light source emits a second optical signal at a second wavelength different from the first wavelength along a third optical axis normal to the surface of the second substrate and such that the second monitor receives a portion of the second optical signal along a fourth optical axis parallel to the third optical axis when the second optical signal and the portion of the second optical signal are proximal to the second light source and the second monitor, respectively;
wherein the first optical assembly includes a first optical element that redirects the first optical signal to the first end of the optical medium and redirects the second optical signal to a second optical element transparent to the first optical signal at the first wavelength and that redirects the second optical signal to the primary light detector, and
wherein the first optical assembly further includes a third optical element and a fourth optical element wherein the first optical element and the third optical element generate total reflection for incident light at the first wavelength and wherein the first optical element generates total reflection for incident light at the second wavelength.

2. The bidirectional communication system of claim 1, wherein the optical medium is a multimode fiber.

3. The bidirectional communication system of claim 1, wherein the first optical element and the fourth optical element redirect the second optical signal at non-zero angles relative to an optical axis of the optical medium.

4. The bidirectional communication system of claim 3, wherein the non-zero angles are within a range from 20 to 45 degrees.

5. The bidirectional communication system of claim 1, wherein the first wavelength is within a range from 840 to 870 nm.

6. The bidirectional communication system of claim 1, wherein the second wavelength is within a range from 890 to 920 nm.

7. The bidirectional communication system of claim 1, wherein the second optical element is a filter.

8. The bidirectional communication system of claim 1, wherein the first monitor arranged on the first substrate and responsive to the portion of the first optical signal at the first wavelength is further reflected from the third optical element.

9. The bidirectional communication system of claim 1, wherein the first optical assembly enables both the first optical signal and the second optical signal to be optically coupled from the first opto-electronic assembly to the optical medium in a single alignment.

10. The bidirectional communication system of claim 1, wherein the second optical assembly enables both the first optical signal and the second optical signal to be optically coupled from the second opto-electronic assembly to the optical medium in a single alignment.

11. The bidirectional communication system of claim 1, wherein the first optical element and the second optical element are arranged to intersect the first optical axis.

12. The bidirectional communication system of claim 1, wherein the primary light detector receives the second optical signal along a fifth optical axis parallel to the first optical axis proximal to the primary light detector and produces electrical signals in response to the second optical signal.

13. The bidirectional communication system of claim 1, wherein the secondary light detector receives the first optical signal along a sixth optical axis parallel to the third optical axis proximal to the secondary light detector and produces electrical signals in response to the first optical signal.

14. The bidirectional communication system of claim 1, wherein the second optical assembly includes a fifth optical element that redirects the second optical signal to the second end of the optical medium and redirects the first optical signal to a sixth optical element transparent to the second optical signal at the second wavelength and that redirects the first optical signal to the secondary light detector.

15. The bidirectional communication system of claim 14, wherein the second monitor arranged on the second substrate and responsive to the portion of the second optical signal at the second wavelength is further reflected from a seventh optical element.

16. The bidirectional communication system of claim 15, wherein the second monitor is responsive to the second optical signal after the second optical signal is redirected from a second surface of the sixth optical element and further redirected by a seventh optical element.

17. The bidirectional communication system of claim 16, wherein the secondary light detector is responsive to the first optical signal after the first optical signal is redirected from a second surface of the sixth optical element and further redirected by an eighth optical element.

18. The bidirectional communication system of claim 14, wherein the fifth optical element and the sixth optical element are arranged to intersect the third optical axis.

19. The bidirectional communication system of claim 14, wherein the sixth optical element of the second optical assembly includes a first surface both partially transparent and partially reflective to the second optical signal at the second wavelength and includes a second surface transparent to the second optical signal at the second wavelength and reflective to the first optical signal at the first wavelength.

20. A method for communicating optical signals, comprising:
- providing an optical medium having a first end and a second end;
- arranging a first light source, a primary light detector and a first monitor on a surface of a first substrate, the first light source emitting a first optical signal at a first wavelength;
- arranging a second light source, a secondary light detector and a second monitor on a surface of a second substrate, the second light source emitting a second optical signal at a second wavelength different from the first wavelength;
- using a first optical assembly to optically couple the first optical signal to the first end of the optical medium using a first lens arranged on a first surface of the first optical assembly and a second lens arranged on an adjacent surface of the first optical assembly;
- using a second optical assembly removed from the first optical assembly to optically couple the second optical signal to the second end of the optical medium using a first lens arranged on a first surface of the second optical assembly and a second lens arranged on an adjacent surface of the second optical assembly;
- using the first optical assembly to optically couple the second optical signal from the first end of the optical medium with the second lens arranged on the adjacent surface of the first optical assembly to the primary light detector using a third lens arranged on the first surface of the first optical assembly, the first optical assembly including a first internal optical element configured to redirect the first optical signal from a first optical axis normal to the surface of the first substrate toward the second lens and thereafter into the first end of the optical medium and redirect the second optical signal to a first surface of a second internal optical element, wherein the first surface of the second internal optical element is transparent to the first optical signal at the first wavelength and reflective to the second optical signal at the second wavelength, the second optical signal being redirected toward the third lens along a second optical axis parallel to the first optical axis, the second internal optical element having a second surface opposed to the first surface, wherein the second surface is partially reflective to the first optical signal at the first wavelength; and
- using the second optical assembly to optically couple the first optical signal from the second end of the optical medium with the second lens on the adjacent surface of the second optical assembly to the secondary light detector using a third lens arranged on the first surface of the second optical assembly, the second optical assembly including a first internal optical element configured to redirect the second optical signal from a third optical axis normal to the surface of the second substrate toward the second lens and thereafter into the second end of the optical medium and redirect the first optical signal to a first surface of a second internal optical element, wherein the first surface of the second internal optical element is transparent to the second optical signal at the second wavelength and reflective to the first optical signal at the first wavelength, the first optical signal being redirected toward the third lens along a fourth optical axis parallel to the third optical axis, the second internal optical element having a second surface opposed to the first surface, wherein the second surface is partially reflective to the second optical signal at the second wavelength.

21. The method of claim 20, wherein the second surface of the second internal optical element of the first optical assembly redirects a portion of the first optical signal to the first monitor.

22. The method of claim 20, wherein wherein the second surface of the second internal optical element of the second optical assembly redirects a portion of the second optical signal to the second monitor.

* * * * *